United States Patent [19]
Putman

[11] 3,798,002
[45] Mar. 19, 1974

[54] COMPUTER CONTROL SYSTEM FOR REFINING AND HYDROGENATION OF UNSATURATED HYDROCARBONS

[75] Inventor: Richard E. Putman, Pittsburgh, Pa.

[73] Assignee: Westinghouse Electric Corporation, Pittsburgh, Pa.

[22] Filed: Dec. 14, 1971

[21] Appl. No.: 208,008

Related U.S. Application Data

[62] Division of Ser. No. 885,405, Dec. 16, 1969, Pat. No. 3,653,842.

[52] U.S. Cl. .................. 23/253 A, 23/260, 23/285, 260/409, 260/690, 260/698, 260/700
[51] Int. Cl. ...... B01j 1/00, C07c 3/12, G01n 27/00
[58] Field of Search .......... 23/253 A, 230 A, 253 R, 23/260, 285; 260/690, 698, 700, 409; 208/DIG. 1; 235/151.12 R, 151.12 MO, 151.12 MI

[56] References Cited
UNITED STATES PATENTS

| | | | |
|---|---|---|---|
| 3,228,858 | 1/1966 | Matyear | 260/683.9 X |
| 3,541,178 | 11/1970 | Nettesheim | 208/143 X |
| 2,932,658 | 4/1960 | Thompson | 260/409 |
| 2,702,238 | 2/1955 | Hays | 23/253 A UX |
| 2,881,235 | 4/1959 | Van Pool | 23/253 A X |
| 3,560,156 | 2/1971 | Teal et al. | 23/253 PC X |

FOREIGN PATENTS OR APPLICATIONS 239,650  11/1969  U.S.S.R. .................. 23/253 A

Primary Examiner—Joseph Scovronek
Attorney, Agent, or Firm—R. G. Brodahl

[57] ABSTRACT

Described is a control system for a refining hydrogenation and deodorizing plant for edible oils and the like wherein various system variables are converted into signals which are fed to a computer which controls the system to optimize performance and reduce oil losses.

4 Claims, 3 Drawing Figures

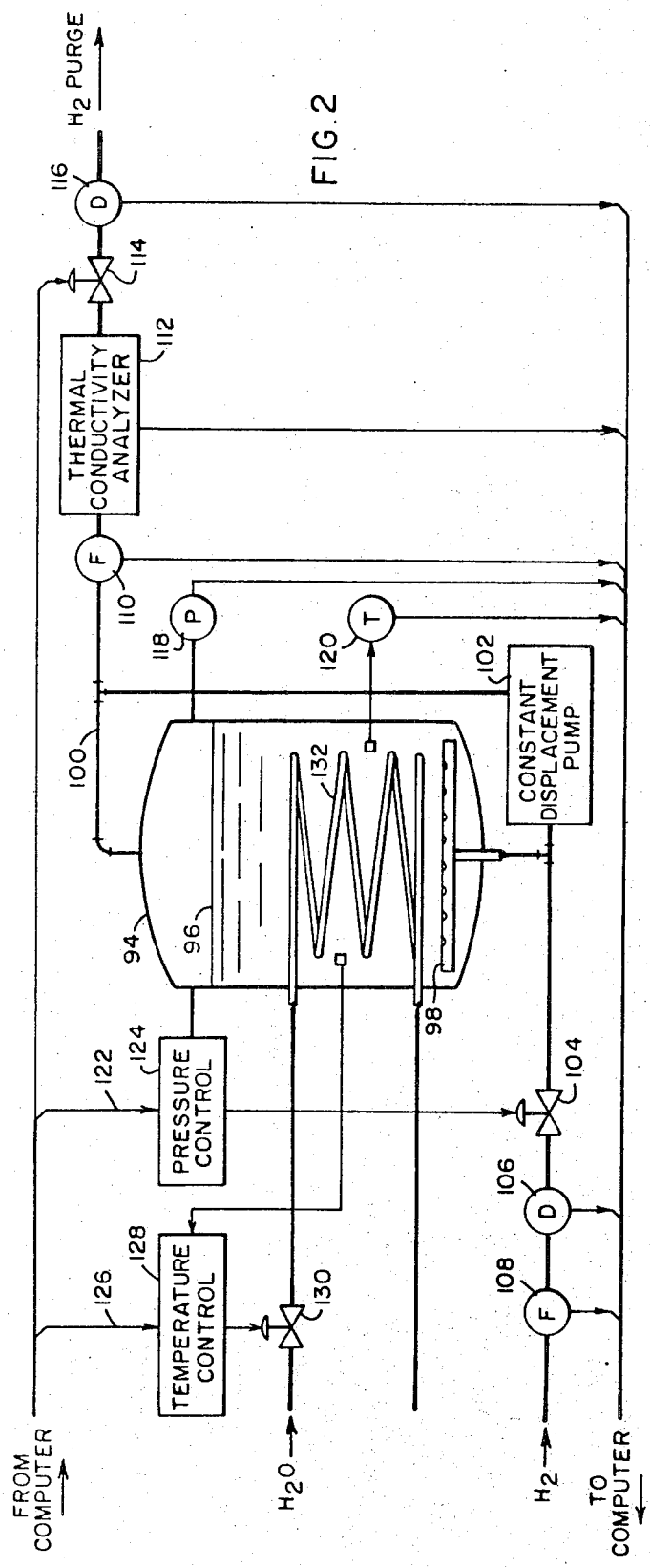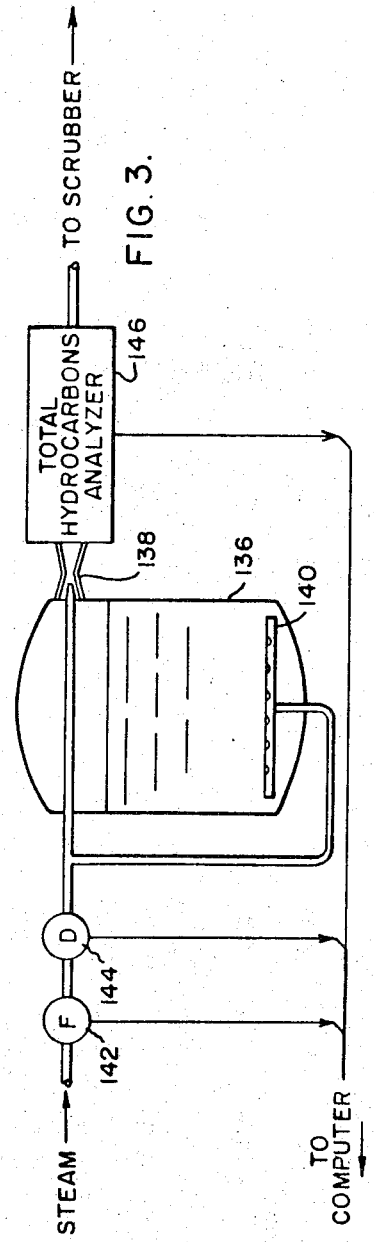

COMPUTER CONTROL SYSTEM FOR REFINING AND HYDROGENATION OF UNSATURATED HYDROCARBONS

CROSS-REFERENCES TO RELATED APPLICATIONS

This application is a division of application, Ser. No. 885,405, filed Dec. 16, 1969, now U.S. Pat. No. 3,653,842 issued Apr. 4, 1972.

BACKGROUND OF THE INVENTION

In a hydrogenation plant, particularly a hydrogenation plant for edible oils, the crude oil is initially refined to remove impurities, then winterized to remove glycerides which would otherwise crystallize in a domestic refrigerator, then hardened or hydrogenated, and finally deodorized to remove volatiles together with residual free fatty acids.

The object of refining is to remove the free fatty acids by neutralizing with a caustic, usually sodium hydroxide, and to remove the phosphatides, proteins or other substances which, after hydration, report to the soap stock in passing through a centrifuge or separator. The oil is pumped with a proportional amount of caustic of predetermined concentration to mixers in which much of the chemical reaction takes place. The reactions include neutralization of the free fatty acids and hydration of gums and the like. The resulting material then passes through a heat exchanger where the temperature is raised to approximately 150°F, and then to primary separators in which the gums and soaps are separated from the neutral oil. The neutral oil, containing traces of sodium and water, then passes through a second heat exchanger to a mixer, into which is also fed heated water together with a small amount of phosphoric acid for the neutralization of any caustic carried over with the neutral oil. This mixed liquid is then pumped to secondary or washing separators. Here the neutral oil is separated from the water and is pumped to a vacuum drier in which any water remaining in the oil is removed.

After winterizing to remove glycerides, the oil is pumped from storage and passes through a heat exchanger where it is heated to approximately 250°F before entering the hydrogenation converter. A catalyst of a suitable grade is slurrified with the oil and pumped into the converter. Hydrogen is then bubbled through the heated oil, in which process the unsaturated oil is converted to a hydrogenated or saturated oil which will harden upon cooling. Finally, the oil is processed in a deodorizing vacuum chamber where volatiles are removed and the remaining free fatty acids are recovered.

In the refining process, enough caustic should be added to remove the free fatty acids and other impurities. However, if too much caustic is added, it converts the desired oil into a soap which is lost in a centrifuge. In the past, the efficiency of the refining process in terms of oil loss has been determined only at the end of a processing cycle for a batch of oil. In other words, excessive caustic addition and soap generation was determined "after the fact" when it was too late to correct the matter for a particular batch.

In a somewhat similar manner, the degree of hydrogenation has heretofore been determined "after the fact" by taking a sample of the oil and determining the iodine value which is linearly related to the amount of hydrogen absorbed by the oil. No known satisfactory means has been devised for continually monitoring the amount of hydrogen absorption to determine the end point of the hydrogenation process.

SUMMARY OF THE INVENTION

As an overall object, the present invention seeks to provide a computer control system for an oil refining and hydrogenation plant whereby the process can be controlled on-line rather than by trial-and-error testing techniques.

More specifically, an object of the invention is to provide a means for controlling an edible oil refining process wherein the sodium content in neutral oil is measured and continually monitored and the caustic-to-oil flow ratio in the system adjusted to attain elimination of fatty acids and other impurities without excessive loss of oil due to saponification.

Another object of the invention is to provide a method for controlling hydrogenation of unsaturated hydrocarbons by a comparison of the mass flow rates of hydrogen into and out of a bath of oil to be hydrogenated.

Still another object of the invention is to provide a new and improved system for deodorizing edible hydrogenated oil by elimination of volatile materials.

In accordance with the invention, optimization of the refining process is achieved by causing a computer to periodically make a deliberate change in the caustic-to-oil flow ratio. The computer also measures the corresponding change in sodium content of the neutral oil, without at this time making a correcting adjustment to back pressure at the output of a centrifuge. If the sodium is deficient, only a small change in sodium in the neutral oil will be detected since the sodium will react with the free fatty acids. If the sodium is in excess, a small change will again be recorded due to saponification. The largest change will occur with maximum neutralization of free fatty acids at minimum saponification of neutral oil. Thus, the computer, by making a series of small changes in the caustic-to-crude oil ratio first in one direction, then in the other and noting the effect on sodium in neutral oil, adjusting back pressure and repeating the process, can establish the optimum caustic-to-crude oil ratio for a given crude. By controlling the sodium content in the neutral oil at an agreed low level, the neutral oil recovery rate also will be optimized.

In the hydrogenation process, hydrogen is bubbled through heated unsaturated oil, most of the gas passing through the oil being pumped back to the inlet. However, the space above the oil is also connected through a suitable valve to a purge outlet in order to bleed off nitrogen which accumulates above the bath of oil. By measuring the hydrogen content of the purged gas, and from a consideration of the net hydrogen absorbed, the nitrogen content of the purged gas can be controlled so as to hold it at some maximum level. Furthermore, from a consideration of the amount of hydrogen fed into the system and that purged with the nitrogen, the total hydrogen absorbed can be determined to determine the end point of the hydrogenation process.

In the deodorizing of the refined oil, the oil is placed within a container and a vacuum is created above the oil by means of steam ejectors. Completion of the deodorizing process is determined by means of a total hydrocarbons analyzer which determines the rate of change of volatile content in the vapor.

The above and other objects and features of the invention will become apparent from the following detailed description taken in connection with the accompanying drawings which form a part of this specification, and in which:

FIG. 2 is a schematic diagram of hydrogenation apparatus for unsaturated oils showing the manner in which it is controlled by means of a computer in accordance with the invention; and FIG. 3 is a schematic diagram of an oil deodorizing system showing the manner in which it is controlled by means of a computer in accordance with the invention.

Figure 1:
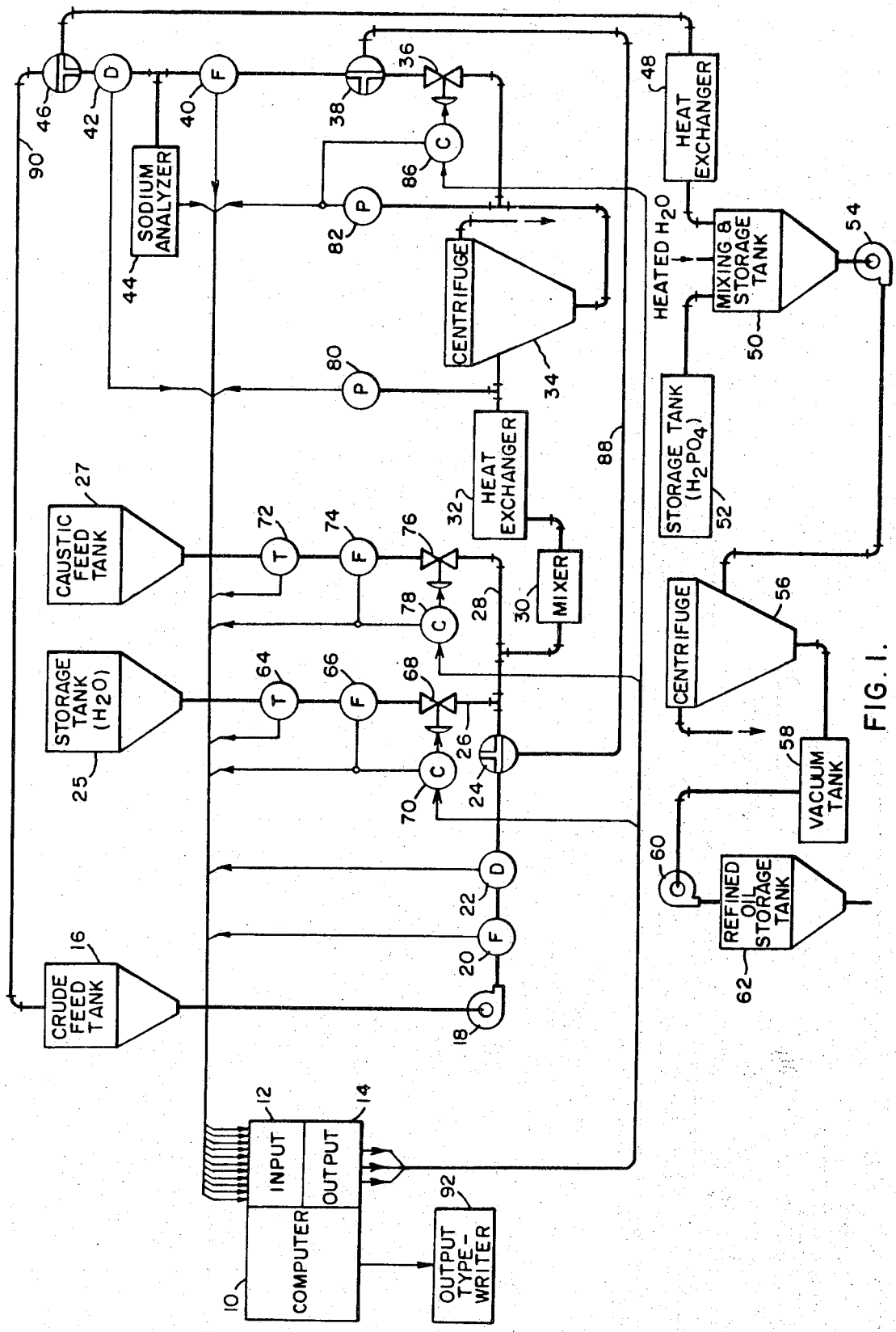
FIG. 1 is a schematic diagram of the crude oil refining system for unsaturated oils showing the manner in which it is controlled by means of a computer in accordance with the invention.

With reference now to the drawings, and particularly to FIG. 1, the system shown includes a computer 10 having input terminals 12 and output terminals 14. As will be seen, the computer 10 is used not only to control the refining process shown in FIG. 1 but also the hydrogenation process of FIG. 2 and the deodorizing process of FIG. 3.

Crude unsaturated oil such as soybean oil, peanut oil, corn oil or the like is stored in a tank 16 and fed by means of pump 18 to a first positive displacement flowmeter 20 and thence to a density meter 22 which may be of the weighted U-tube type. The signals from flowmeter 20 and density meter 22 are fed to the computer 10 as shown.

After passing through the density meter 22, the crude oil passes through a three-way valve 24, after which water from storage tank 25 and a caustic such as sodium hydroxide from a caustic feed tank 27 is added to the oil via conduits 26 and 28. The mixture then passes to a mixer 30 where much of the chemical reaction between the caustic and free fatty acids as well as hydration occurs. The mixture then passes through a heat exchanger 32 where the temperature is raised to approximately 150°F and then to a first centrifuge 34. The centrifuge 34, which operates on the principle of differential specific gravities, causes the mixture to rotate whereby the heavier soaps and impurities will be caused to flow radially outwardly while the refined oil remains at the center of the centrifuge. The soaps are skimmed off and the refined oil passed through valve 36 and three-way valve 38 to a second positive displacement flowmeter 40 and a second density meter 42. The flowmeter 40 and density meter 42 also produce electrical signals which are fed back to the input of computer 10.

Connected to the conduit carrying the refined oil intermediate the flowmeter 40 and density meter 42 is a flame photometer 44 designed for the measurement of sodium concentration. The photometer 44, therefore, provides a means for determining whether excess sodium has been added to the oil. The analyzer 44 also produces an electrical signal which is fed to the input of computer 10.

After passing through density meter 42, the oil passes through a third three-way valve 46 and thence through a heat exchanger 48 to a mixing tank 50 where it is mixed with water and phosphoric acid supplied from a storage tank 52. The phosphoric acid, which is added in only small amounts, serves to neutralize any residual caustic in the neutral oil.

From the storage tank 50, the oil is pumped by pump 54 to a second centrifuge 56. Here the neutral oil is separated from the water and is thereafter pumped to a vacuum drier 58 where any water remaining in the oil is removed. The refined oil is then pumped by pump 60 to a refined oil tank 62 where it is stored preparatory to its being hydrogenated.

The lye added to the oil from tank 27 consists of sodium hydroxide dissolved in water, the amount of water present varying with sodium hydroxide concentration. The caustic-to-oil flow ratio is a chemical relationship determined by the need to neutralize the free fatty acids without excessive saponification of neutral oil. The water, on the other hand, all reports to the soap since only traces are found in the neutral oil. The total amount of water added may, therefore, be regarded as that required to insure a free flowing soap.

In the system shown in FIG. 1, the water and lye flow rates are controlled separately; and it is necessary to make up a lye with a concentration which requires dilution by the on-line addition of water. This means the system must run with a lye concentration slightly higher than would ordinarily be the case. The water, in passing from tank 25, passes a thermometer 64 and then passes through a flowmeter 66 and a valve 68. An electrical signal proportional to the temperature of the water is applied to the computer 10, as is the flow rate as determined by the flowmeter 66. The flowmeter 66 also controls a controller 70 for the valve 68, the set point for the controller being derived from the output of the computer 10.

Likewise, the caustic solution, as it passes from tank 27, first has its temperature measured by thermometer 72 and then passes through flowmeter 74 and valve 76 before it reaches the mixer 30. Signals proportional to temperature and flow rate from elements 72 and 74 are applied to the input of the computer 10, the output of the flowmeter 74 also being used to control a controller 78 for the valve 76. The controller 78, like controller 70, receives the set point signal from the output of the computer 10.

Connected to the input and output of the centrifuge 34 are pressure sensing devices 80 and 82. These pressure sensing devices 80 and 82 produce electrical signals, proportional to pressure, which are fed back to the input of computer 10. The pressure sensor 82 also serves to control a controller 86 for valve 36, the controller 86 receiving a set point signal from the output of computer 10.

It can be seen, therefore, that the computer controls the setting of valve 36 as well as the settings of valves 68 and 76 in order to add the correct amount of caustic to the oil without excessive saponification of the oil due to an excess of sodium.

Neglecting traces of sodium and water in the neutral oil, the recovery of neutral oil, R, can be calculated as follows:

$$R = (G_n \cdot D_n / G_o \cdot D_o \cdot N_o)$$

(1)

where $G_n$ = neutral oil flow as determined by flowmeter 40;

$D_n$ = neutral oil density as determined by density meter 42;

$G_o$ = crude oil flow as determined by flowmeter 20;

$D_o$ = crude oil density as determined by density meter 22; and $N_o$ = neutral oil in crude oil as determined by analysis.

The precision with which this calculation can be carried out depends upon the accuracy of instrument calibration. If, during a calibration run, the same oil under the same conditions is passed through the two sets of flow and density meters (20, 22 and 40, 42) in series, a calibration factor (fa) can be calculated for the ratio $G_n/G_o$ and another calibration factor (fd) for the ratio $D_n/D_o$. Equation (1) then bcomes:

$$R = (fa) \cdot (G_n/G_o) \cdot (fd) \cdot (D_n/D_o) \cdot (1/N_o) \quad (2)$$

In order to initially calibrate the system of FIG. 1, the three-way valves 24, 38 and 46 are adjusted such that oil from density meter 22 flows through by-pass conduit 88 to meters 40 and 42 and thence through valve 46 and conduit 90 back to storage tank 16. Under these conditions, the computer 10 calculates the values for (fa) and (fd). When the valves 24, 38 and 46 are then returned to the positions shown in FIG. 1 and the refining process started, the computer 10 continually calculates recovery, R, and prints it out on typewriter 92. This gives the operator an up-to-date indication of recovery such that if the recovery is too low, corrective action can be taken immediately instead of waiting until a complete batch of oil has been processed and the weight of the refined oil compared with the weight of the crude.

The flow rate, $F_L$, of lye into the mixer 30 can be expressed as $$F_L = G_L \cdot D_L \quad (3)$$

where:

$G_L$ = the flow rate as determined by meter 74, and $D_L = K(T_L \cdot Na_C)$ where K is a constant, $T_L$ is the temperature measured by thermometer 72 and $Na_C$ is the sodium in the lye as NaOH.

$Na_C$ will be inserted into the computer via an operator's console after laboratory titration of a sample. Thus, by measuring temperature via thermometer 72, flow rate via meter 74, and from a knowledge of sodium in the lye, the computer 10 can solve equation (3) above to determine the flow rate of lye into the mixer 30. This is applied as a set point signal to the controller 78.

Similarly, the computer can compute the amount of water, $W_L$, added with the lye from:

$$W_L = F_L (100 - Na_C/100) \quad (4)$$

and the amount of dilution water, $W_D$, added from tank 25 from:

$$W_D = 62.3 \cdot G_w \cdot K(T_w) \quad (5)$$

where:

$G_w$ = water flow rate determined by meter 66;

K = a constant; and $T_w$ = the temperature of the water as determined by thermometer 64.

The pressure transducers 80 and 82 also send signals to the computer 10 indicative of the input and back pressures of the centrifuge 34. If the back pressure should increase without a corresponding increase in input pressure, it is known that more material is reporting as soap stock.

Optimizing of the process is carried out as follows: the computer can periodically make a deliberate change (increase) in caustic-to-oil flow ratio by adjustment of valve 76 and/or valve 68 and measure the corresponding change in sodium content by the sodium analyzer 44 without at this time making a correcting adjustment to back pressure via valve 36. As a diagnostic statement, it can be said that if the sodium is deficient, only a small change in sodium in the neutral oil will be detected since the sodium will react with the free fatty acids. If the sodium is in excess, on the other hand, a small change will again be recorded due to saponification. The largest change will occur with maximum neutralization of free fatty acids and minimum saponification of the neutral oil. Thus, the computer, by making a series of small changes in caustic crude oil ratio first in one direction, then in the other, and noting the effects in the sodium neutral oil, adjusting back pressure via valve 36 and repeating the process, can establish the optimum sodium hydroxide-crude oil ratio for a given crude. All of this, of course, is controlled primarily by the reading of the sodium analyzer 44; while sodium content is varied by controlling centrifuge back pressure via a set point signal to controller 86. As back pressure increases, the sodium content will decrease and vice versa.

With reference now to FIG. 2, the hydrogenation equipment for the crude oil refined in the process of FIG. 1 is shown. It includes a reaction tank 94 into which a batch of refined oil is poured up to the level 96. At the bottom of tank 94 is a conduit 98 having a plurality of openings therein which permit hydrogen to bubble up through the oil within the tank. The space above the level 96 in the tank 94 is connected through conduit 100 and constant displacement pump 102 to the conduit 98. The conduit 98 is also connected through control valve 104, a density meter 106 and a flowmeter 108 to a source of hydrogen under pressure. The signals from the density meter 106 and flowmeter 108 are applied to the computer shown in FIG. 1.

The conduit 100 is connected through a second flowmeter 110, a thermal conductivity analyzer 112, a purge valve 114 and a density meter 116 to a purge outlet port. The signals from flowmeter 110, thermal conductivity analyzer 112 and density meter 116 are also fed back to the computer shown in FIG. 1. In the space above the level 96 of the oil in tank 94, nitrogen will accumulate, and it is the purpose of the purge valve 114 to permit a certain amount of the gas to escape in order to prevent an excessive accumulation of nitrogen above the oil in the tank 94. The thermal conductivity analyzer 112 determines the amount of hydrogen in the purged gas.

The pressure of the gas above the level of the oil in tank 94 is determined by means of a pressure transducer 118 which applies a signal back to the computer 10 of FIG. 1. Similarly, the temperature of the oil within tank 94 is measured by thermometer 120 which produces an electrical signal fed back to the computer 10. The signal from pressure transducer 118 is utilized by the computer to produce a set point signal on lead 122 for a pressure controller 124 which regulates the setting of valve 104. The signal from thermometer 120, when fed back to the computer 10, provides a set point signal on lead 126 for a temperature controller 128. The temperature controller 128, in turn, controls a valve 130 supplying cooling water to cooling coils 132 within the tank 94.

In the control of the hydrogenation process, the amount of hydrogen flowing into the tank 94 is determined from a consideration of the flow rate and density signals produced by meters 106 and 108. The amount of hydrogen leaving the system is determined by the thermal conductivity analyzer in combination with the meters 110 and 116. The net hydrogen absorbed by the oil, therefore, is the difference between the amount of hydrogen flowing into the system and the amount flowing out; and when this amount reaches the desired value for a particular weight of oil within the tank 94, the process is stopped. The signals from the thermal conductivity analyzer 112 and the meters 110 and 116 also serve to establish the setting of valve 114, determining the amount of gas which is purged from the top of the tank 94. As the amount of hydrogen in the purged gas decreases, it is known that the amount of nitrogen is increasing and vice versa.

With reference now to FIG. 3, a deodorizer for refined oil is shown. It includes a vessel 136 into which a batch of oil is poured. Connected to the wall of the vessel 136 above the level of oil therein is a steam ejector 138 which creates a partial vacuum above the oil in the vessel 136. At the bottom of the vessel 136 is a conduit 140 connected to a supply of steam and having openings therein such that steam will bubble up through the oil. The flow rate and density of the steam fed into the system are measured by flowmeter 142 and density meter 144, respectively. The steam output is fed through a total hydrocarbons analyzer 146 to a scrubber, not shown, where the volatiles are recovered. The analyzer 146 is of the type based upon the flame ionization principle.

It is known that the higher the vacuum above the oil in the vessel 136, the shorter is the time required to complete deodorizing of a batch of oil. The vaporization efficiency of the process is also a function of the surface area of the steam bubbles passing upwardly through the oil and the time during which they are in contact with the oil. The temperature of the oil is a further factor in the control of the process, since it determines the vapor pressures of the components which are to be removed. The hydraulic head of the oil in the vessel also exerts an effect on the amount of vaporization efficiency.

Oil losses occur by entrainment in the steam exhausted from the deodorizer vessel and by distillation of the free fatty acids which can be formed by hydrolysis. In the case of the free fatty acids, there comes a point where the formation of them by hydrolysis equals the rate of distillation. With regard to entrainment, the higher the steam flow rate, the higher the oil losses. Less steam is, however, required when a higher vacuum can be obtained.

Both oil losses and deodorizing time are reduced at higher vacuums. However, the capacity of the vacuum generating system to handle vapors is limited. The amount of vacuum will also vary from time-to-time dependent on the availability and pressure of the steam supplied to the ejectors and to the cooling water temperature supplied to the barometric condensers in the scrubber. This is thus a major constraint on the system.

The real check on completion of the deodorizing process is the rate of change of volatile content in the vapor. Reaching a low asymptotic value is an indication that an equilibrium condition has been established and that no further improvement can be made in the oil by additional time in the vessel. The operation is advised of this effect via the total hydrocarbons analyzer 146 such that the deodorizing process can be terminated and the batch removed.

It is also possible to estimate the total amount of volatiles of all types driven off between times $t_0$ and $t_1$ for a constant stripping steam flow. The basic relationship between the total amount of steam, S, required to reduce the volatiles from concentration $V_A$ to concentration $V_B$ is:

$$S = k \ln (V_A/V_B) \tag{6}$$

where $k$ is a function of the total and partial pressures, the vaporization efficiency and the total amount of oil. Thus, if the total amounts of stripping steam $S_1$ and $S_2$ consumed between times $t_0$ and $t_1$ and between times $t_1$ and $t_2$, respectively, are known together with the corresponding amounts of volatiles driven off, $V_1$ and $V_2$, then:

$$S_1 = k \ln (V_A/V_A - V_1) \tag{7}$$

and $$S_2 = k \ln [(V_A - V_1)/V_A - (V_1 + V_2)] \tag{8}$$

From the foregoing equations, the constants $k$ and $V_A$ can be solved by the computer. The amounts of volatiles $V_1$ and $V_2$ are determined and fed back to the computer by the total hydrocarbons analyzer 146 while the quantities $S_1$ and $S_2$ are determined and fed back to the computer from the elements 142 and 144. Knowing now the quantity $V_A$ and the desired value of $V_B$, the total amount of steam required may be calculated; and, knowing the stripping steam rate, the time required for the volatiles concentration to fall to the value $V_B$ can be estimated. As will be appreciated, the computer can then automatically terminate the flow of steam at the desired value or can produce an indication such that the operator can perform this function manually.

Although the invention has been shown in connection with certain specific embodiments, it will be readily apparent to those skilled in the art that various changes in form and arrangement of parts may be made to suit requirements without departing from the spirit and scope of the invention.

I claim as my invention:

1. In a system for hydrogenating unsaturated liquid hydrocarbons, the combination of a vessel containing liquid unsaturated hydrocarbons to be hydrogenated and having a gas-filled space above the level of the liquid hydrocarbons therein, means for bubbling hydrogen through the hydrocarbons within said vessel, means for purging at least a portion of the gases above the liquid level of hydrocarbons in said vessel, means for producing electrical signal means which varies as a function of the amount of hydrogen fed into said vessel, means for producing electrical signal means indicative of the amount of hydrogen purged from said vessel, computer means responsive to both of said electrical signal means for computing the amount of hydrogen absorbed by said liquid hydrocarbons, and control means coupled to said computer means for stopping the flow of hydrogen into said vessel when the amount of hydrogen absorbed by the hydrocarbons has reached a desired value.

2. The combination of claim 1 including means for producing an electrical signal which varies as a function of the pressure of the gases above the level of the liquid hydrocarbons in said vessel, and means including said computer means for controlling the pressure of the hydrogen fed into said vessel as a function of the magnitude of said signal which varies as a function of pressure.

3. The combination of claim 1 including cooling coil means within said vessel, means for producing an electrical signal which varies as a function of the temperature of the liquid hydrocarbons within said vessel, and means including said computer means responsive to said electrical signal for controlling the amount of coolant passing through said cooling coil means.

4. The combination of claim 1 including a flowmeter, a density meter and a thermal conductivity analyzer through which hydrogen purged from said vessel is passed and wherein the amount of hydrogen purged from said vessel is determined by electrical signals fed to said computer from said flowmeter, the density meter and the thermal conductivity analyzer.

* * * * *